(12) United States Patent
Sugata et al.

(10) Patent No.: US 6,899,496 B2
(45) Date of Patent: May 31, 2005

(54) MAIN SHAFT DEVICE FOR MACHINE TOOLS

(75) Inventors: Shinsuke Sugata, Hiroshima (JP); Tadashi Makiyama, Hiroshima (JP)

(73) Assignee: Horkos Corp., Fukuyama (JP)

( * ) Notice: Subject to any disclaimer, the term of this patent is extended or adjusted under 35 U.S.C. 154(b) by 18 days.

(21) Appl. No.: 10/476,573

(22) PCT Filed: May 27, 2002

(86) PCT No.: PCT/JP02/05127
§ 371 (c)(1),
(2), (4) Date: Oct. 31, 2003

(87) PCT Pub. No.: WO02/098604
PCT Pub. Date: Dec. 12, 2002

(65) Prior Publication Data
US 2004/0136799 A1 Jul. 15, 2004

(30) Foreign Application Priority Data
Jun. 4, 2001 (JP) ........................................ 2001-167795

(51) Int. Cl.⁷ ...................... B23C 009/00; B23Q 011/10
(52) U.S. Cl. ........................... 409/136; 408/58; 408/59; 408/60
(58) Field of Search ................................ 409/135–136; 408/56–61

(56) References Cited

U.S. PATENT DOCUMENTS

| | | | | |
|---|---|---|---|---|
| 4,320,999 A | * | 3/1982 | Briese | 409/136 |
| 5,203,651 A | * | 4/1993 | Johnson | 408/59 |
| 5,649,714 A | * | 7/1997 | Uchida et al. | 409/136 |
| 6,059,702 A | * | 5/2000 | Winkler et al. | 409/136 |
| 6,305,696 B1 | * | 10/2001 | Sugata et al. | 408/57 |
| 6,582,167 B1 | * | 6/2003 | Kobayashi et al. | 409/136 |
| 2004/0067113 A1 | * | 4/2004 | Sugata et al. | 408/60 |
| 2004/0161315 A1 | * | 8/2004 | Sugata et al. | 409/64 |

FOREIGN PATENT DOCUMENTS

| | | |
|---|---|---|
| JP | 2000-84791 A | 3/2000 |
| JP | 2001-18148 A | 1/2001 |
| JP | 3316680 B1 | 6/2002 |

* cited by examiner

Primary Examiner—Erica Cadugan
(74) Attorney, Agent, or Firm—Merek, Blackmon & Voorhees, LLC

(57) ABSTRACT

A main shaft device for machine tools designed to prevent the wasting of cutting fluid mists and contamination of a machining environment with cutting fluid mists by feeding optimum amounts of cutting fluid mists in a variety of machining operations, comprising a mist feed tube (14) disposed in the rotational center of a main shaft (2) driven for rotation, the front of the mist feed tube (14) being inserted in the rotational center of a tool holder (8) fixed to the front of the main shaft (2) to ensure that the cutting fluid mists flowing out of the front end of the mist feed tube (14) spout from the front end surface of a cutting tool (17) fixed to the tool holder (8), via a mist passageway (h1) in the tool holder (8), the main shaft device being characterized in that the mist feed tube (14) has an adjusting nozzle member (16) removably fixed to the front thereof for controlling the flow rate of the cutting fluid mists flowing out of the feed tube (14) into the mist passageway of the tool holder (8).

4 Claims, 2 Drawing Sheets

MAIN SHAFT DEVICE FOR MACHINE TOOLS

FIELD OF THE INVENTION

The present invention relates to a main shaft device for machine tools, which spouts cutting fluid mists from the front end of a cutting tool.

BACKGROUND OF THE INVENTION

This applicant has already provided with a main shaft device for machine tools that a mist feed tube for feeding cutting fluid mists from the rear side of a main shaft to the front side thereof is disposed in the rotation center of the main shaft driven for rotation, and the front of the mist feed tube is inserted into the rotation center of a tool holder fixed to the front of the main shaft to ensure that the cutting fluid mists flowing out of the front end of the mist feed tube spout from the front end of a cutting tool fixed to a tool holder via a mist passageway in the rotation center of the tool holder and via a mist hole of a cutting tool fixed to the tool holder.

The above-mentioned main shaft device is generally provided with a marketable cutting tool. The caliber of a mist hole is suitably decided in accordance with the outer diameter and the length of a cutting tool body, a form of cutting tool or cutting tool maker's own peculiar reasons. Generally, the caliber is about as large as size to pass sufficient cutting fluid mists in various machining by the cutting tool.

The above-mentioned main shaft device has enough capacity for feeding the cutting fluid mists by the mist feed tube in general machining. Accordingly, the cutting fluid mists flowing out of the mist feed tube spout from the front end surface of the cutting tool in the flow rate depending on the caliber or the length of the mist hole of the cutting tool.

Therefore, in almost practical machining, too many cutting fluid mists spout from the front end surface of the cutting tool, thereby causing the wasting of cutting fluid mists and contamination of a machining environment with cutting fluid mists.

The present invention aims to provide a main shaft device for machine tools that can settle the above problems.

SUMMARY OF THE INVENTION

A main shaft for machine tools comprising a mist feed tube for feeding cutting fluid mists from the rear side of a main shaft to the front side thereof disposed in the rotation center of the main shaft driven for rotation, the front of the mist feed tube being inserted in a mist passageway (through hole h1) in the rotation center of a tool holder fixed to the front of the main shaft to ensure that the cutting fluid mists flowing out of the front end of the mist feed tube spout from the front end surface of a cutting tool fixed to the tool holder via the mist passageway in the tool holder, wherein the mist feed tube has an adjusting nozzle member exchangeably fixed to the front thereof through removable means for controlling the flow rate of the cutting fluid mists flowing out of the feed tube into the mist passageway of the tool holder.

In specified machining which the main shaft device of the present invention is used, when too many or too few cutting fluid mists spout from the front end surface of the cutting tool, the adjusting nozzle member fixed to the mist feed tube is exchangeably installed. According to this, the flow rate of the cutting fluid mists flowing out of the front of the mist feed tube into the mist passageway of the tool holder changes, thereby optimizing amounts of cutting fluid mists spouted from the front end surface of the cutting tool.

In this case, the caliber of a nozzle hole in the adjusting nozzle member forms about 80% or less of the minimum caliber of an inner hole in the mist feed tube. According to this, amounts of cutting fluid mists spouted from the front end surface of the cutting tool are effectively controlled. On the other hand, when the size is larger than 80% of the minimum caliber of the inner hole, for example, when a ratio is about 85%, the flow of cutting fluid mists spouted from the front end surface of the cutting tool can not be controlled effectively.

PREFERRED EMBODIMENT OF THE INVENTION

The invention will be described with reference to the drawings.

Figure 1:
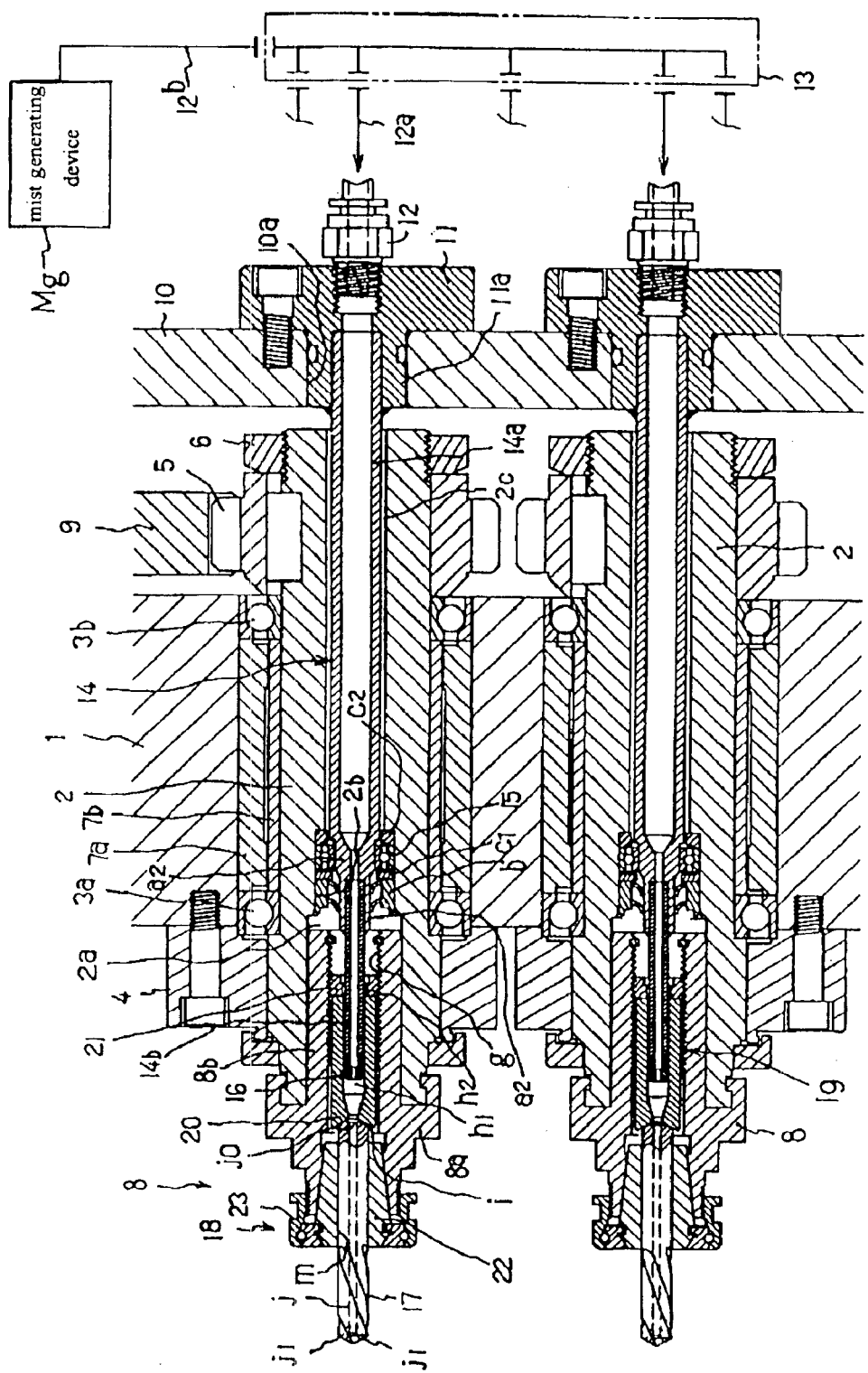
FIG. 1 is a cross-sectional view at side sight of a main shaft device for machine tools showing an example of the invention.
Figure 2:
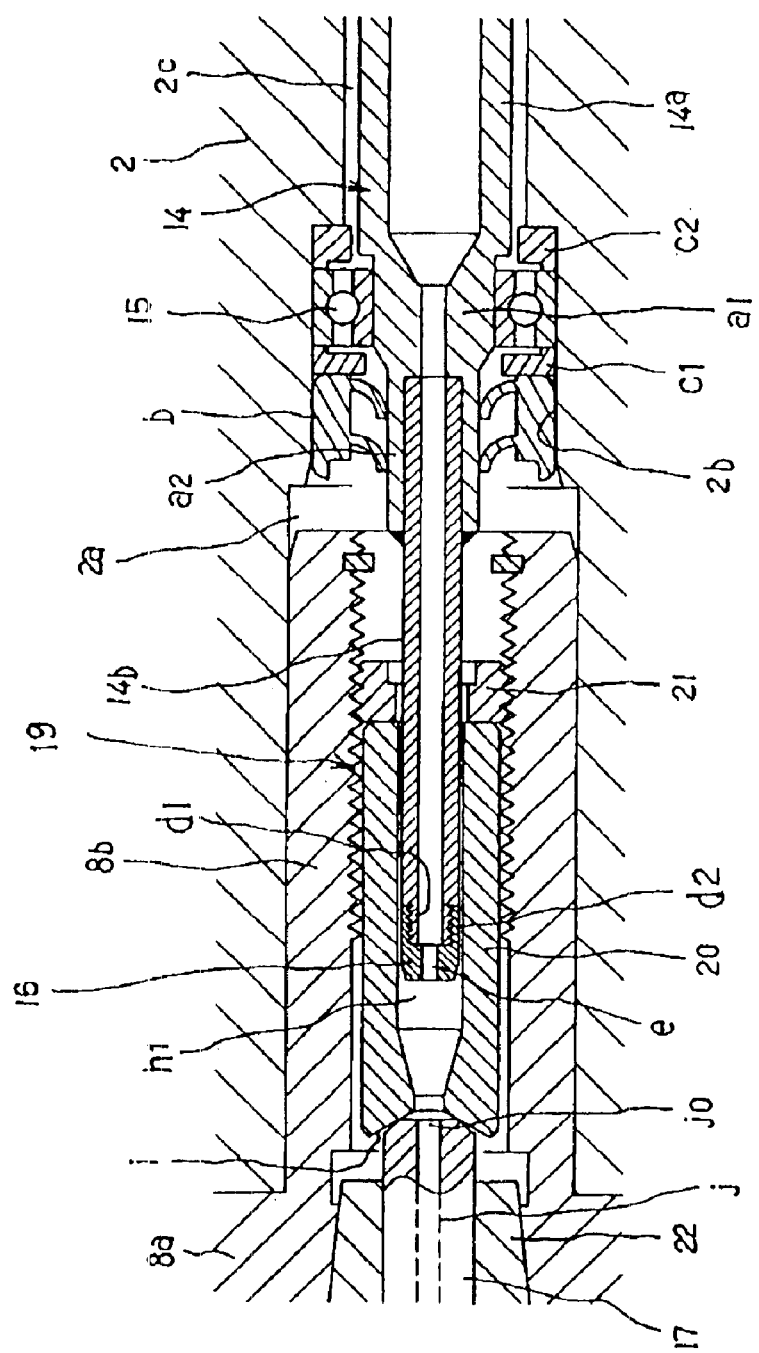
FIG. 2 is a cross-sectional view at side sight showing an important part of the main shaft device.

FIG. 1 shows a cross-section of a partial main shaft device for machine tool, with plenty of main shafts of an embodiment of the invention viewed from side sight. FIG. 2 shows a cross-section of an important part of the main shaft device viewed from side sight.

In these drawings, 1 is a base flame of a main shaft device, and a main shaft 2 is installed in the flame 1 through bearings 3a, 3b rotatably at a fixed position.

Here, 4 is a ring member fixedly bolted to the front end surface of the flame 1, and 5 is an input gear externally inserted into and keyedly fixed to the rear end surface of the main shaft 2. Numeral 6 is a nut body for controlling the input gear 5 from getting out of the main shaft 2, screwed to the rear end surface of the main shaft 2. Numeral 7a, 7b are cylindrical spacers for controlling longitudinal positions of the bearings 3a, 3b.

The main shaft 2 has an interfitted hole 2a with a straight cylindrical female surface at the center of the front end, and straight reducing central holes 2b, 2c connectively with the interfitted hole 2a. Numeral 8 is a tool holder mainly composed of a holder body 8a, and a partial interfitting part 8b thereof is internally fitted to the interfitted hole 2a of the main shaft 2.

Numeral 9 is a transmission gear rotatably supported by the flame 1 and engaged with the input gear 5, receiving rotation from a not-illustrated motor.

Numeral 10 is an additional flame provided behind the main shaft 2, having a through hole 10a just behind the main shaft 2. A cylindrical interfitting part 11a of a feed passageway member 11 is inserted into the through hole 10a, and the rear of the feed passageway member 11 is fixedly bolted to the additional flame 10. A splicing fitting 12 is screwed to the rear end portion of the feed passageway member 11. The splicing fitting 12 is connected to a mist feed branch line 12a extending from a distributor 13 installed apart from the main shaft device. The distributor 13 connects with a mist feed line 12b extending from a publicly known mist-generating device Mg.

A straight mist feed tube 14 non-touchable to the main shaft 2 is inserted into the interfitted hole 2a and the central holes 2b, 2c of the main shaft 2 non-rotatably and concentrically with the rotation center of the main shaft. As for the mist feed tube 14, a small caliber tube part 14b is elongatively fixed to the front of a base tube part 14a. The front of the tube part 14a forms small caliber parts a1, a2 with steps. A bearing 15 for rotatably supporting the small caliber part a1 is installed between the small caliber part a1 and the central hole 2b, and a ring seal member b is installed in front of the bearing 15 between the other small caliber part a2 and the central hole 2b. The rear end of the tube part 14a is fluid-tightly inserted into a central hole of the splicing fitting 12, and the front end of the small caliber tube part 14b arrives in the central hole 2a.

In this case, an inner hole of the small caliber tube part 14b and an inner hole of the base tube part 14a are straight cylindrical holes, and the caliber of the inner hole of the small caliber tube part 14b is smaller than that of the base tube part 14a. Ring-shaped spacers c1, c2 are formed between the bearing 15 and the ring seal member b as well as between the bearing 15 and the front end of the central hole 2c.

A short and small adjusting nozzle member 16 is removably fixed to the front of the small caliber tube part 14b. Concretely, a male thread d1 is formed to the front end of the small caliber tube part 14b, and a female thread d2 to the rear of the nozzle member 16. Here, the female thread d2 is screwed on the male thread d1. The nozzle member 16 forms an outer diameter equal in size to the small caliber tube part 14b, having a nozzle hole e in a rotation center direction of the main shaft. Here, the caliber of the nozzle hole e forms about 80% or less of the minimum caliber of the inner hole in the mist feed tube 14 (which is an inner hole of the small caliber tube part 14b in drawings). Besides, when the cutting fluid mists flow out to the front of the main shaft 2 through the nozzle hole e, the nozzle member 16 causes a throttling effect to its flow, thereby controlling the cutting fluid mists from flowing out. The nozzle member 16 is, in response to necessities, exchanged to another adjusting nozzle member 16 different in size to the caliber of the nozzle hole e. In this case, the plural kinds of what have the caliber different in size to the nozzle hole e are prepared as the another adjusting nozzle member 16 in advance.

The tool holder 8 has a collet chuck 18 for fastening and fixing a peripheral surface of a cutting tool 17 positioned at the center of the front of the holder body 8a on the holder body 8a. Besides, the tool holder 8 has a central hole g with thread part at the center of the holder body 8a. A cutting tool longitudinal position engaging means 19 is installed into the central hole g.

The engaging means 19 comprises a cutting tool engaging member 20 and a male thread member 21. The engaging member 20 is inserted into the central hole g, touching to the rear end surface of the cutting tool 17. And, the male thread member 21 is screwed into the thread part of the central hole g, changeably adjusting the longitudinal position of the engaging member 20. Here, longitudinal through holes h1, h2 are respectively formed at each center of the engaging member 20 and the male thread part 21. The small caliber tube part 14b and the nozzle member 16 are non-contactably inserted into the longitudinal through holes h1, h2. Here, the inserting length is shorter than the longitudinal length of the interfitted hole 8b.

In this case, the longitudinal through holes h1, h2 of the engaging member 20 closely resemble the small caliber tube part 14b or the nozzle member 16 in the outer diameter, going on the rear end of the cutting tool 17 through a conical female surface part i. Here, the flowing length of cutting fluid mists is shortened as short as possible.

The collet chuck 18 comprises a collet 22 surrounding the peripheral surface of the cutting tool 17 and an operating nut part 23 for displacing the collet 22 in a longitudinal direction.

Besides, the cutting tool 17 has a straight mist passageway j at the center. The front of the mist passageway j is forkedly branched, and the branched parts are respectively communicated to outlet openings j1, j1. The outlet openings j1, j1 are formed to both sides holding the center of the specified diameter of the front end surface of the cutting tool 17 therebetween. The rear end of the mist passageway j is communicated to an inlet opening j0 formed to the center of the rear end surface of the cutting tool 17. In drawings, though the cutting tool 17 is a twist drill, it is not limited to this.

Next, a use example and its operation of thus constructed main shaft device will be explained.

When the cutting tool 17 is attached or detached, the nut part 23 of the collet chuck 18 is rotated to the relaxing side, and the collet 22 is displaced forwardly. In this case, the caliber of the central hole m of the collet 22 is enlarged. When attaching the cutting tool 17, the rear thereof is inserted into the central hole m until the rear end is touched to the front surface of the engaging member 20. Then, the nut part 23 is rotatably operated to the fastening side as keeping touchable state, and the collet 22 is displaced backwardly. According to this, the collet 22 reduces the caliber of the central hole m by wedge effect of the taper surface, and therefore, the cutting tool 17 is fasteningly fixed to the holder body 8a.

When changing a longitudinal position of cutting tool 17 to the holder body 8a, the tool holder 8 is released and removed from coupling with the main shaft 2. And then, the male thread part 21 is suitably rotated under such a condition that the cutting tool 17 is removed or under such a condition that the cutting tool 17 is longitudinally displaced. According to this, the male thread member 21 is displaced to a specified direction relating to the rotating direction by thread feed effect, changeably adjusting the position of the engaging member 20 to the holder body 8a. Thereafter, the cutting tool 17 is fixed to the holder body 8a so that the rear end surface touches to the front end surface of the engaging member 20. Thus the tool holder is fixed to the main shaft 2.

Attaching/detaching the tool holder 8 to the main shaft 2 is accomplished by pulling the interfitting part 8b of the holder body 8a out of the interfitted hole 2a of the main shaft 2 or inserting it therein. In this case, since the interfitting part 8b is exactly guided in a central longitudinal direction of the main shaft 2, the small caliber tube part 14b and the nozzle member 16 do not touch to the longitudinal through holes h1, h2 of the engaging means 20.

Next a machining state of a work will be explained. The main shaft 2 receives rotation of a not-illustrated motor through the transmission gear 9 or the input gear 5, rotating at a fixed position of the flame 1 as supported by the bearings 3a, 3b. The rotation of the main shaft 2 is transmitted to the cutting tool 17 through the holder body 8a and the collet chuck 18. In this case, the engaging means 20 is also rotated integrally with the holder body 8a.

On the other hand, the bearing 15 supports the front end of the mist feed tube 14, and the rear end thereof is supported integrally with the additional flame 10. Therefore, the mist feed tube 14 keeps non-rotatable even if the main shaft 2 rotates. Accordingly, the nozzle member 16 fixed to the mist feed tube 14 keeps non-rotatable. In this case, the seal member b air tightly closes an interval between the peripheral surface of the central hole 2b of the non-rotatable main shaft 2 and the tube part 14a of the non-rotatable mist feed tube 14.

Thereafter, cutting fluid mists (fine cutting fluid grains lie scattered in air) generated in the mist-generating device Mg are fed into the mist feed tube 14 through the mist feed line 12b and the distributor 13, or through the mist feed branching line 12a and the feed passageway member 11. The cutting fluid mists arrived in the mist feed tube 14 flow out into the through hole h1 of the engaging member 20 through the nozzle hole e of the nozzle member 16 as receiving throttle effect thereof. In this case, the nozzle member 16 works so as to control the flow of cutting fluid mists from the mist feed tube 14 to the longitudinal through hole h1 in a fixed rate. Accordingly, the cutting fluid mists arrive in the through hole h1 of the engaging member 20 in a suitable flow rate, thereafter spouting out of the outlet openings j1, j1 of the front end of the cutting tool 17 through the mist passageway j. Thus spouted cutting fluid mists equally lubricate a friction position between the cutting tool 17 and the work, cooling it so as not to be heated.

While the cutting fluid mists are flowing in the main shaft 2 or the tool holder 8, the cutting fluid mists flowed out of the nozzle member 16 are apt to leak into the air through a ring space formed between the though hole h1 of the engaging member 20 and the outer peripheral surface of the small caliber tube part 14b. However, an airtight interfitting coupling between the tool holder 8 and the main shaft 2 prevents the cutting fluid mists from flowing out in front of the interfitted hole 2a of the main shaft 2, and the seal member b prevents them from flowing out of the interior of the interfitted hole 2a backwardly.

The cutting fluid mists flowing out of the outlet openings j1, j1 of the front end surface of the cutting tool 17 are apt to liquefy due to pressure change, speed change and centrifugal force. However, since the mist feed tube 14 and the nozzle member 16 are straightly arranged in keeping non-rotatable, the cutting fluid mists from the rear of the main shaft 2 to the front end of the mist feed tube 14 are inhibited from large pressure change or speed change, and do not receive any centrifugal force by the rotation of the main shaft 2, thereby preventing the liquefaction effectively.

Besides, the cutting fluid mists flowed out of the nozzle member 16 flow out through the through hole h1 of the engaging member 20 or the mist passageway j of the cutting tool 17. In this case, since the through hole h1 and the mist passageway j have comparatively large caliber in comparison with the nozzle hole e of the nozzle member 16, the cutting fluid mists can flow without large flowing resistance. Even if the through hole h1 and the mist passageway j exist at the rotation center of the tool holder 8, their length is shorter than that of the main shaft 2, and their caliber is larger than that of the nozzle hole e, since their caliber is still small in relation to centrifugal force added to the cutting fluid mists by the rotation of the tool holder 8, the cutting fluid mists flowing therein never receive the large centrifugal force for a long time. Accordingly, the cutting fluid mists are effectively controlled from liquefying in the through hole h1 or in the mist passageway j.

When machining a new work with the above-mentioned main shaft device in different conditions, the cutting fluid mists spouted from the front end surface of the cutting tool 17 are sometimes too many, and sometimes too few. In this case, the tool holder 8 is removed from the main shaft 2, thereby exposing the small caliber tube part 14b outwardly.

Then, the nozzle member 16 fixed to the front of the small caliber tube part 14b is removed by cancellation of the thread coupling and exchangeably installed to another new adjusting nozzle member 16 with a nozzle hole e of different caliber.

Therefore, the flow of cutting fluid mists due to the nozzle member 16 is differently controlled, and the flow rate of cutting fluid mists spouted from the front end surface of the cutting tool 17 is optimized.

According to the invention constructed as above mentioned, even if cutting fluid mists are constantly fed into a mist feed tube, the flow rate of cutting fluid mists spouted from the front end surface of a cutting tool is optionally changed by an exchange of adjusting nozzle members to another one. Therefore, optimum amounts of cutting fluid mists are fed to the front end of the cutting tool in working under various machining conditions, thereby preventing the wasting of cutting fluid mists and contamination of a machining environment with cutting fluid mists. Besides, a tool holder is removable under such a condition that the adjusting nozzle member is fixed to the mist feed tube, and the exchangeable installation of adjusting nozzle members is conveniently accomplished by removing the tool holder from the main shaft. Moreover, these are realized by only changing the front of the mist feed tube in a conventional main shaft device.

Furthermore, since the caliber of a nozzle hole in an adjusting nozzle member forms about 80% or less of the minimum caliber of an inner hole in a mist feed tube, the flow rate of cutting fluid mists spouted from the front end surface of a cutting tool is effectively changed.

What is claimed is:

1. A main shaft device for machine tools comprising:
   a main shaft (2) driven for rotation, said main shaft having a front, a rear and a rotational center;
   a mist feed tube (14) disposed in the rotational center of the main shaft (2), said mist feed tube feeding cutting fluid mists from the rear of the main shaft to the front thereof, said mist feed tube having a front end inserted in a mist passageway in a rotational center of a tool holder (8) fixed to the front of the main shaft (2) to ensure that the cutting fluid mists flowing out of the front end of the mist feed tube (14) spout from a front end surface of a cutting tool (17) fixed to the tool holder (8) via the mist passageway (h1) in the tool holder (8),
   wherein the mist feed tube (14) has an adjusting nozzle member (16) changeably fixed to the front of the mist feed tube (14) for controlling the flow rate of cutting fluid mists flowing out of the mist feed tube into the mist passageway of the tool holder (8).

2. A main shaft device for machine tools as claimed in claim 1, wherein the flow rate of cutting fluid mists flowing out of the mist feed tube (14) into the mist passageway (h1) is adjustable by an exchangeable installation of a different adjusting nozzle member (16).

3. A main shaft device for machine tools as claimed in claim 2, wherein the adjusting nozzle member (16) has a nozzle hole (e) having a caliber that is 80% or less of the minimum caliber of the inner opening in the mist feed tube (14).

4. A main shaft device for machine tools as claimed in claim 1, wherein the adjusting nozzle (16) has a nozzle hole (e) having a caliber that is 80% or less of the minimum caliber of the inner opening in the mist feed tube (14).

* * * * *